US008959307B1

(12) United States Patent
Bruce et al.

(10) Patent No.: US 8,959,307 B1
(45) Date of Patent: Feb. 17, 2015

(54) REDUCED LATENCY MEMORY READ TRANSACTIONS IN STORAGE DEVICES

(75) Inventors: Rey H. Bruce, San Jose, CA (US); Ricardo H. Bruce, Union City, CA (US); Elsbeth Lauren Tagayo-Villapaña, Las Pinas (PH)

(73) Assignee: BiTMICRO Networks, Inc., Fremont, CA (US)

( * ) Notice: Subject to any disclaimer, the term of this patent is extended or adjusted under 35 U.S.C. 154(b) by 212 days.

(21) Appl. No.: 12/270,626

(22) Filed: Nov. 13, 2008

Related U.S. Application Data

(60) Provisional application No. 60/988,728, filed on Nov. 16, 2007.

(51) Int. Cl.
*G06F 12/00* (2006.01)

(52) U.S. Cl.
USPC ............................. 711/170; 711/103; 711/137

(58) Field of Classification Search
USPC .......................................... 711/103, 137, 170
See application file for complete search history.

(56) References Cited

U.S. PATENT DOCUMENTS

| 4,752,871 | A | 6/1988 | Sparks |
| 5,222,046 | A | 6/1993 | Kreifels et al. |
| 5,297,148 | A | 3/1994 | Harari et al. |
| 5,341,339 | A | 8/1994 | Wells |
| 5,371,709 | A | 12/1994 | Fisher et al. |
| 5,379,401 | A | 1/1995 | Robinson et al. |
| 5,388,083 | A | 2/1995 | Assar et al. |
| 5,396,468 | A | 3/1995 | Harari et al. |
| 5,406,529 | A | 4/1995 | Asano |
| 5,432,748 | A | 7/1995 | Hsu et al. |
| 5,448,577 | A | 9/1995 | Wells et al. |
| 5,459,850 | A | 10/1995 | Clay et al. |
| 5,479,638 | A | 12/1995 | Assar et al. |
| 5,485,595 | A | 1/1996 | Assar et al. |

(Continued)

FOREIGN PATENT DOCUMENTS

| JP | 2004-127068 | 11/2005 |
| JP | 2005-309847 | 11/2005 |
| WO | WO 94/06210 | 3/1994 |

OTHER PUBLICATIONS

"Security Comes to SNMP: The SNMPv3 Proposed Internet Standards", http://www.cisco.com, vol. 3 No. 3, 8 pgs.

(Continued)

*Primary Examiner* — Kalpit Parikh
(74) *Attorney, Agent, or Firm* — Stephen Uriarte (57) ABSTRACT

A solution for performing reduced latency memory read transactions is disclosed. In one example, a storage apparatus has a memory array that includes: a flash device having a data register, a memory interface coupled to the memory array and a buffer set that includes at least one buffer suitable for use as a prefetch buffer. The memory interface, in response to a memory read transaction request, performs a read operation and, if stored data exists within the memory array that meets a prefetch selection criterion, also performs an internal read operation. The internal read operation includes allocating a prefetch buffer in the buffer set and storing the data as prefetch data in the prefetch buffer. If the memory interface receives a second memory read transaction request for data that is currently available as prefetch data, the memory interface responds by performing a forwarding transaction that includes retrieving the prefetch data from the prefetch buffer and forwarding the prefetch data to a host.

37 Claims, 4 Drawing Sheets

(56) References Cited

U.S. PATENT DOCUMENTS

| | | | |
|---|---|---|---|
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari et al. |
| 5,535,356 A | 7/1996 | Kim et al. |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,737,742 A | 4/1998 | Achiwa et al. |
| 5,802,554 A | 9/1998 | Caceres et al. |
| 5,819,307 A | 10/1998 | Iwamoto et al. |
| 5,822,251 A | 10/1998 | Bruce et al. |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,943,421 A | 8/1999 | Grabon |
| 6,000,006 A | 12/1999 | Bruce et al. |
| 6,215,875 B1 | 4/2001 | Nohda |
| 6,230,269 B1 | 5/2001 | Spies et al. |
| 6,298,071 B1 | 10/2001 | Taylor et al. |
| 6,363,441 B1 | 3/2002 | Beniz et al. |
| 6,363,444 B1 | 3/2002 | Platko et al. |
| 6,404,772 B1 | 6/2002 | Beach et al. |
| 6,526,506 B1 | 2/2003 | Lewis |
| 6,529,416 B2 | 3/2003 | Bruce et al. |
| 6,557,095 B1 | 4/2003 | Henstrom |
| 6,857,076 B1 | 2/2005 | Klein |
| 6,901,499 B2 | 5/2005 | Aasheim et al. |
| 6,961,805 B2 | 11/2005 | Lakhani et al. |
| 6,970,446 B2 | 11/2005 | Krischer et al. |
| 6,980,795 B1 | 12/2005 | Hermann et al. |
| 7,103,684 B2 * | 9/2006 | Chen et al. ............ 710/62 |
| 7,174,438 B2 | 2/2007 | Homma et al. |
| 7,194,766 B2 | 3/2007 | Noehring et al. |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 5/2008 | Fujimoto et al. |
| 7,500,063 B2 * | 3/2009 | Zohar et al. ............ 711/137 |
| 7,620,748 B1 | 11/2009 | Bruce et al. |
| 7,660,941 B2 | 2/2010 | Lee et al. |
| 7,716,389 B1 | 5/2010 | Bruce et al. |
| 7,743,202 B2 * | 6/2010 | Tsai et al. ............ 711/103 |
| 7,765,359 B2 * | 7/2010 | Kang et al. ............ 711/103 |
| 7,934,052 B2 * | 4/2011 | Prins et al. ............ 711/103 |
| 8,200,879 B1 | 6/2012 | Falik et al. |
| 8,375,257 B2 | 2/2013 | Hong et al. |
| 8,447,908 B2 | 5/2013 | Bruce et al. |
| 8,510,631 B2 | 8/2013 | Wu et al. |
| 8,560,804 B2 | 10/2013 | Bruce et al. |
| 8,707,134 B2 | 4/2014 | Takahashi et al. |
| 8,713,417 B2 | 4/2014 | Jo |
| 8,788,725 B2 | 7/2014 | Bruce et al. |
| 2001/0010066 A1 | 7/2001 | Chin et al. |
| 2002/0073324 A1 | 6/2002 | Hsu et al. |
| 2002/0083262 A1 | 6/2002 | Fukuzumi |
| 2002/0141244 A1 | 10/2002 | Bruce et al. |
| 2003/0163624 A1 | 8/2003 | Matsui et al. |
| 2003/0182576 A1 | 9/2003 | Morlang et al. |
| 2003/0204675 A1 * | 10/2003 | Dover et al. ............ 711/137 |
| 2003/0223585 A1 | 12/2003 | Tardo et al. |
| 2004/0128553 A1 | 7/2004 | Buer et al. |
| 2006/0095709 A1 | 5/2006 | Achiwa |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0083680 A1 | 4/2007 | King et al. |
| 2007/0130439 A1 | 6/2007 | Andersson et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2009/0094411 A1 | 4/2009 | Que |
| 2009/0158085 A1 | 6/2009 | Kern et al. |
| 2009/0172250 A1 | 7/2009 | Allen et al. |
| 2009/0172466 A1 | 7/2009 | Royer et al. |
| 2011/0113186 A1 | 5/2011 | Bruce et al. |
| 2011/0161568 A1 | 6/2011 | Bruce et al. |
| 2011/0167204 A1 | 7/2011 | Estakhri et al. |
| 2011/0202709 A1 | 8/2011 | Rychlik |
| 2011/0264884 A1 | 10/2011 | Kim |
| 2013/0246694 A1 | 9/2013 | Bruce et al. |

OTHER PUBLICATIONS

USPTO Notice of Allowability & attachment(s) mailed Jan. 7, 2013 for U.S. Appl. No. 12/876,247.
Office Action mailed Sep. 14, 2012 for U.S. Appl. No. 12/876,247.
Office Action mailed Feb. 1, 2012 for U.S. Appl. No. 12/876,247.
Office Action for U.S. Appl. No. 13/475,878, mailed on Jun. 23, 2014.
Office Action for U.S. Appl. No. 13/253,912 mailed on Jul. 16, 2014.
Office Action for U.S. Appl. No. 12/876,113 mailed on Jul. 11, 2014.
Office Action for U.S. Appl. No. 12/876,113 mailed on Mar. 13, 2014.
Advisory Action for U.S. Appl. No. 12/876,113 mailed on Sep. 6, 2013.
Office Action for U.S. Appl. No. 12/876,113 mailed on May 14, 2013.
Office Action for U.S. Appl. No. 12/876,113 mailed on Dec. 21, 2012.
Security Comes to SNMP: The New SNMPv3 Proposed Internet Standard, The Internet Protocol Journal, vol. 1, No. 3, Dec. 1998.
Notice of Allowability for U.S. Appl. No. 12/882,059 mailed on May 30, 2013.
Notice of Allowability for U.S. Appl. No. 12/882,059 mailed on Feb. 14, 2013.
Office Action for U.S. Appl. No. 12/882,059 mailed on May 11, 2012.
Notice of Allowability for U.S. Appl. No. 14/038,684 mailed on Aug. 1, 2014.
Office Action for U.S. Appl. No. 14/038,684 mailed on Mar. 17, 2014.
Notice of Allowability for U.S. Appl. No. 13/890,229 mailed on Feb. 20, 2014.
Office Action for U.S. Appl. No. 13/890,229 mailed on Oct. 8, 2013.
Office Action for U.S. Appl. No. 13/475,878 mailed on Dec. 4, 2014.
Office Action for U.S. Appl. No. 12/876,113 mailed on Dec. 5, 2014.
Notice of Allowability for U.S. Appl. No. 14/038,684 mailed on Dec. 5, 2014.

* cited by examiner

REDUCED LATENCY MEMORY READ TRANSACTIONS IN STORAGE DEVICES

CROSS-REFERENCE TO RELATED APPLICATIONS

This application claims the benefit of U.S. Provisional Application, filed 16 Nov. 2007 and entitled "Apparatus and Method for Performing Reduced Latency Memory Read Transactions", having Provisional Application Ser. No. 60/988,728.

FIELD OF INVENTION

The present invention relates to solutions for achieving reduced latency memory read transactions in storage or memory devices. More particularly, these solutions achieve reduced latency memory read transactions by allocating a prefetch buffer from a set of buffers that includes at least one buffer, such as a data register, from a flash device.

BACKGROUND

The relentless increase in Internet usage and e-commerce as well as the proliferation of networked digital computing devices has driven the demand for not only large capacity data storage but also high data availability and sophisticated data management, such as storage virtualization. To meet these needs, many vendors offer networked attached storage (NAS) devices, storage array network (SAN) devices and sophisticated servers that have directly attached arrays of mass storage. These solutions can provide users with managed access to their data directly from their computing device or through a network and with high data availability. These solutions are not without challenges, however.

One challenge includes reducing latency in memory read transactions. For example, in enterprise database applications or in on-line transaction processing, massive amounts of data may need to be sorted or filtered. This requires that these applications have access to storage devices that can not only provide large data capacity but perform low latency memory read transactions for data stored randomly in the storage devices. Another example includes on-demand video applications. These applications must have access to storage devices that can retrieve large amounts of sequential data, such as video, with low latency and in multiple streams in order to maximize viewing enjoyment of the video in real-time by multiple end-users.

Yet another example requiring reduced latency in memory read transactions includes a storage virtualization application that can aggregate a pool of storage that can be used by requesting hosts. This pool of storage may include a set of storage devices that may be interconnected through a LAN, WAN or both, and that may use mass storage devices that have relatively high memory transaction read latency, such as hard disk drives (HDD), or that are coupled to a network with a relatively low network bandwidth.

Consequently, a need exists for a storage device that can provide low latency memory read transactions in a variety of applications.

SUMMARY

A solution for performing reduced latency memory read transactions is disclosed. In one example, this solution may include a storage apparatus having a memory array that includes: a flash device having a data register, a memory interface coupled to the memory array and a buffer set that includes at least one buffer that is suitable for use as a prefetch buffer. The buffer set, where one buffer in the buffer set includes a data register, is coupled to the memory interface. The memory interface, in response to a memory read transaction request, performs a read operation and, if stored data exists within the memory array that meets at least one prefetch selection criterion, also performs an internal read operation. The internal read operation includes allocating a prefetch buffer in the buffer set and storing the data as prefetch data in the prefetch buffer. If the memory interface receives a second memory read transaction request for data and if the data is currently available as prefetch data in the prefetch buffer, the memory interface responds by performing a forwarding transaction that includes retrieving the prefetch data from the prefetch buffer and forwarding the prefetch data to a host.

DETAILED DESCRIPTION OF THE INVENTION

While the invention has been described in conjunction with a specific best mode, it is to be understood that many alternatives, modifications, and variations will be apparent to those skilled in the art in light of the following description. Those skilled in the art would recognize after reviewing this application that the embodiments disclosed, including embodiments directed to methods or processes, can be implemented using various types of integrated circuits, including microprocessors, programmable logic arrays, such as FPGAs, discrete active and passive devices, such as logic gates and logic functions, or any combination of these devices. The use of these devices in the embodiments of the invention shown below would not require undue experimentation or further invention. In addition, for clarity purposes, not all of the routine features of the embodiments described herein are shown or described. It is appreciated that in the development of any such actual implementation, numerous implementation-specific decisions must be made to achieve the developer's specific goals. These specific goals will vary from one implementation to another and from one developer to another. Moreover, it will be appreciated that such a development effort might be complex and time-consuming but would nevertheless be a routine engineering undertaking for those of ordinary skill in the art having the benefit of this disclosure.

Various embodiments of the present invention disclosed herein pertain to achieving reduced memory transaction read latency in a memory device, such as a storage apparatus that employs a memory interface coupled to a memory array. Reduced read latency may be achieved in such a storage apparatus by allocating a buffer from a set of at least one buffer, such as a data register included in a flash device, and by using this allocated buffer to store prefetch data. The number of buffers allocated as prefetch buffers for storing prefetch data may be selected at the time of manufacture, at the time of boot-up or dynamically as needed by the storage apparatus. In this example, this flash device comprises at least a portion of the memory array.

Figure 1:
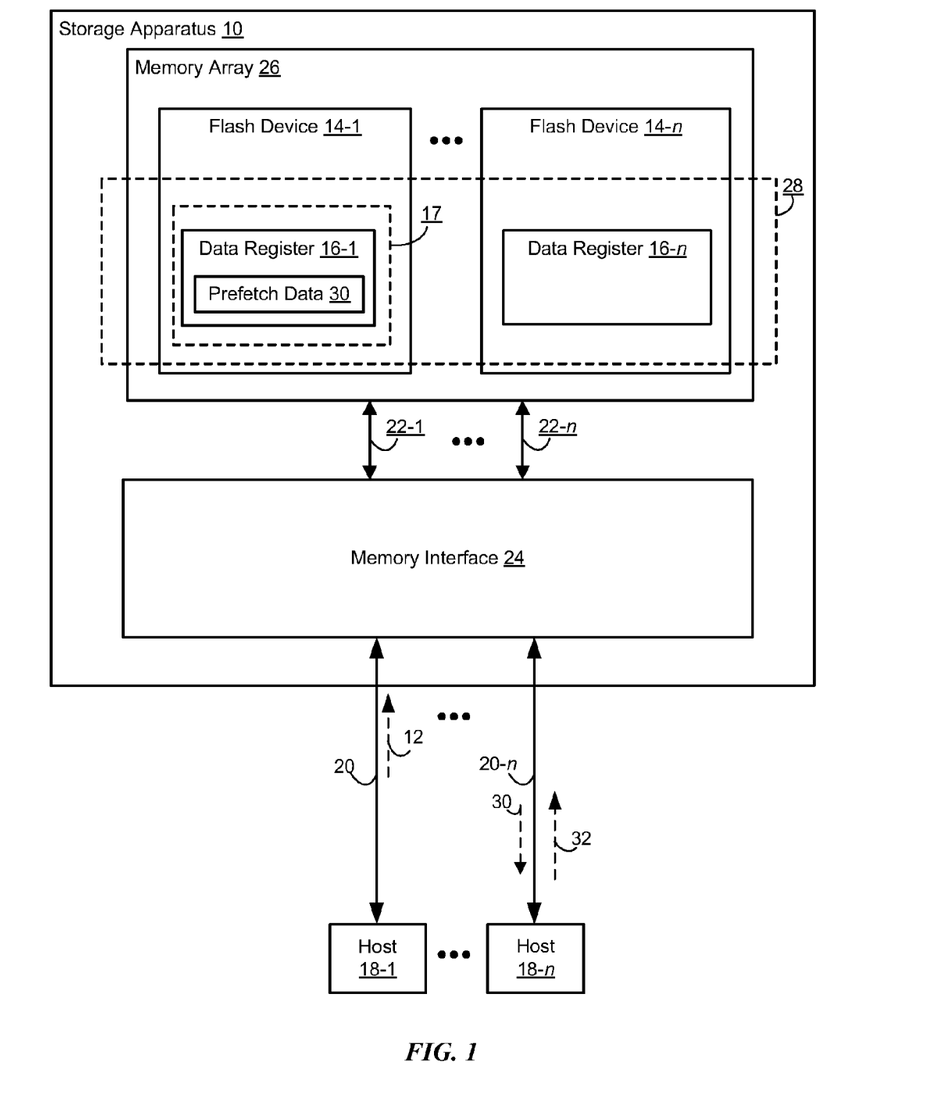
FIG. 1 is a block diagram of a reduced latency storage apparatus in accordance with a first embodiment of the present invention.

Referring now to FIG. 1, reduced memory read transaction latency may be achieved by using a storage apparatus 10 that includes a memory interface 24 coupled via a memory bus 22-1 to a memory array 26. Memory array 26 includes at least one flash device, such as flash devices 14-1 through 14-n, where n may be any number greater than zero (0). The flash devices may include data registers. For example, flash devices 14-1 and 14-n may respectively include data registers 16-1 through 16-n. The data registers form part of buffer set 28. The term "flash device" is intended to include any form of non-volatile memory that includes a set of non-volatile memory cells, including multi-level memory cells. This flash device permits read and write operations to be performed on these memory cells according to a protocol supported by the flash device. This flash device may be implemented using a flash memory device that complies with the Open NAND Flash Interface Specification, commonly referred to as ONFI Specification. The term "ONFI Specification" is a known device interface standard created by a consortium of technology companies, called the "ONFI Workgroup". The ONFI Workgroup develops open standards for NAND flash memory devices and for devices that communicate with these NAND flash memory devices. The ONFI Workgroup is headquartered in Hillsboro, Oreg. Using a flash device that complies with the ONFI Specification is not intended to limit the embodiment disclosed. One of ordinary skill in the art having the benefit of this disclosure would readily recognize that other types of flash devices employing different device interface protocols may be used, such as protocols compatible with the standards created through the Non-Volatile Memory Host Controller Interface ("NVMHCI") working group. Members of the NVMHCI working group include Intel Corporation of Santa Clara, Calif., Dell Inc. of Round Rock, Tex. and Microsoft Corporation of Redmond, Wash.

Memory interface 24 responds to a memory read transaction request 12 received via bus 20 from host 18-1 by performing on memory array 26 a memory operation that corresponds to the transaction requested by host 18-1. For example, if memory interface 24 receives memory read transaction request 12, memory interface 24 performs a read operation on memory array 26 and returns the result of the read operation, such as read data, along bus 20 to host 18-1. Data returned as a result of the read operation is hereinafter called "read data". Memory interface 24 may also perform an internal read operation if data exists in memory array 26 that meets at least one prefetch selection criterion. This prefetch selection criterion may include a relationship between read data, and a data portion existing in memory array 26, named "stored data". The type of relationship between read data and stored data is not intended to be limiting in any way. Any type of relationship may be used that increases the likelihood that the stored data selected for prefetching will be later requested by a host coupled to a memory interface 24, such as host 18-1. For example, this prefetch selection criterion may be met if stored data exists that has a memory address that differs from the read data within a selected memory address range. In another example, memory interface 24 determines whether the prefetch selection criterion is met by determining whether any stored data exists in memory array 26 that has a memory address within the same page as a memory address associated with the read data.

The term "host", such as host 18-1 shown in this embodiment, means any device that has the ability to transmit a memory read transaction request to storage apparatus 10. For example, this may include host 18-1 that can generate a memory read transaction request 12 and that can receive a response resulting from the processing of memory read transaction request 12 by memory interface 24. Memory interface 24 may process memory transactions from more than one requesting device, such as host 18-1 through host 18-n. For example, as shown in FIG. 1, host 18-1 may generate a memory read transaction request 12, while another host 18-n may receive a response, such as prefetch data 30, that is a result of another subsequent memory read transaction request 32 sent by host 18-n.

The term "data portion" is intended to refer to any data size granularity used by storage apparatus 10 to address data stored in memory array 26. For example, data may be addressed in increments that may include a flash page, flash block, a file or the like.

If memory interface 24 determines the prefetch selection criterion is met, it initiates an internal read operation. This internal read operation includes memory interface 24 retrieving data that meets the prefetch selection criterion from memory array 26. Memory interface 24 may perform this internal read operation without host prompting. However, if memory interface 24 determines the prefetch selection criterion has not been met, memory interface 24 does not perform this internal read operation. Data retrieved from memory array 26 that meets the prefetch selection criterion is hereinafter called "prefetch data".

As part of the internal read operation, memory interface 24 allocates at least one buffer from buffer set 28 to store prefetch data 30. The number of buffers allocated by memory interface 24 as prefetch buffers for storing prefetch data may be selected at the time of manufacture, at the time of initialization or dynamically as needed by the storage apparatus. In one implementation, the number of buffers allocated as prefetch buffers may be initially selected by memory interface 24. Memory interface 24 may then dynamically adjust the number of buffers after initialization, depending on an amount of storage needed for data treated as prefetch data during the processing of memory read transaction requests. For example in FIG. 1, memory interface 24 may allocate data register 16-1 as a storage space suitable for storing prefetch data 30. This action may render non-allocated buffers, such as data registers 16-n in buffer set 28, available to storage apparatus 10 for other memory uses as needed. Buffers allocated for storing prefetch data, such as buffer 16-1 are hereinafter called "prefetch buffers". Storing prefetch data 30 in a prefetch buffer, such as prefetch buffer 17, renders prefetch data 30 readily available to a requesting host if requested by the host, such as through a subsequent memory read transaction request.

Allocation of a prefetch buffer in the above manner is not to be taken as a limitation in any way. One of ordinary skill in the art having the benefit of this disclosure may use other techniques or procedures to allocate a buffer as a prefetch buffer for storing prefetch data. For example, memory array 26 may further include at least one HDD, which is not shown to avoid overcomplicating this disclosure. During initialization, memory interface 24 operating under program control may by default prefetch data from random areas in this HDD. This configuration option may be preferable when low latency performance during random access is required, such as in database applications. Another option may include configuring memory interface 24 through program code to provide an option in the form of a vendor-specific interface command to allow a host, such as host 18-1, to select the prefetching method to be used by memory interface 24 during initialization. For instance, if storage apparatus 10 will be used to store large files that tend to be stored sequentially, such as video files, memory interface 24 may be configured to prefetch sequential data rather than random data. To reduce initialization time of storage apparatus 10, these prefetching options during initialization may be disabled. In another possible configuration, storage apparatus 10 may support a host-controlled non-volatile cache command set. This allows a host, such as host 18-1, to keep selected data in low latency non-volatile memory that may form a portion of memory array 26, such as flash devices 14-1 through 14-n, rendering this selected data to be available as prefetch data during initialization. During initialization, memory interface 24 operating under the program control detects this selected data and automatically prefetches this data by storing the data in a prefetch buffer.

If memory interface 24 receives memory read transaction request 32, which may be subsequent to memory read transaction request 12, and the data requested by memory read transaction request 32 is currently available in prefetch buffer 17 as prefetch data 30, memory interface 24 will initiate a forwarding transaction, reducing the read latency of the memory read transaction resulting from memory read transaction request 32. This forwarding transaction includes retrieving the prefetch data previously stored in a prefetch buffer, such as prefetch data 30 and prefetch buffer 17, respectively, and forwarding prefetch data 30 to the requesting host, such as host 18-n.

Storage apparatus 10 also includes a data transmission conduit, such as a memory bus 22-1, for coupling memory interface 24 and memory array 26. Memory interface 24 uses memory bus 22-1 as a conduit for transferring data between memory interface 24 and memory array 26. Memory bus 22-1 may include additional memory bus 22-n, where n may be any number greater than zero. Additional memory buses, such as memory bus 22-n, may be implemented to accompany an expansion of memory array 26. Memory bus 22-1 though 22-n are provided as one possible implementation feature and are not intended to be limiting in any way. Bus 20 may be used to couple host 18-1 to storage apparatus 10. Additional buses, such as bus 20-n, may be implemented to enable additional hosts, such as host 18-n, to communicate with memory interface 24.

Figure 2:
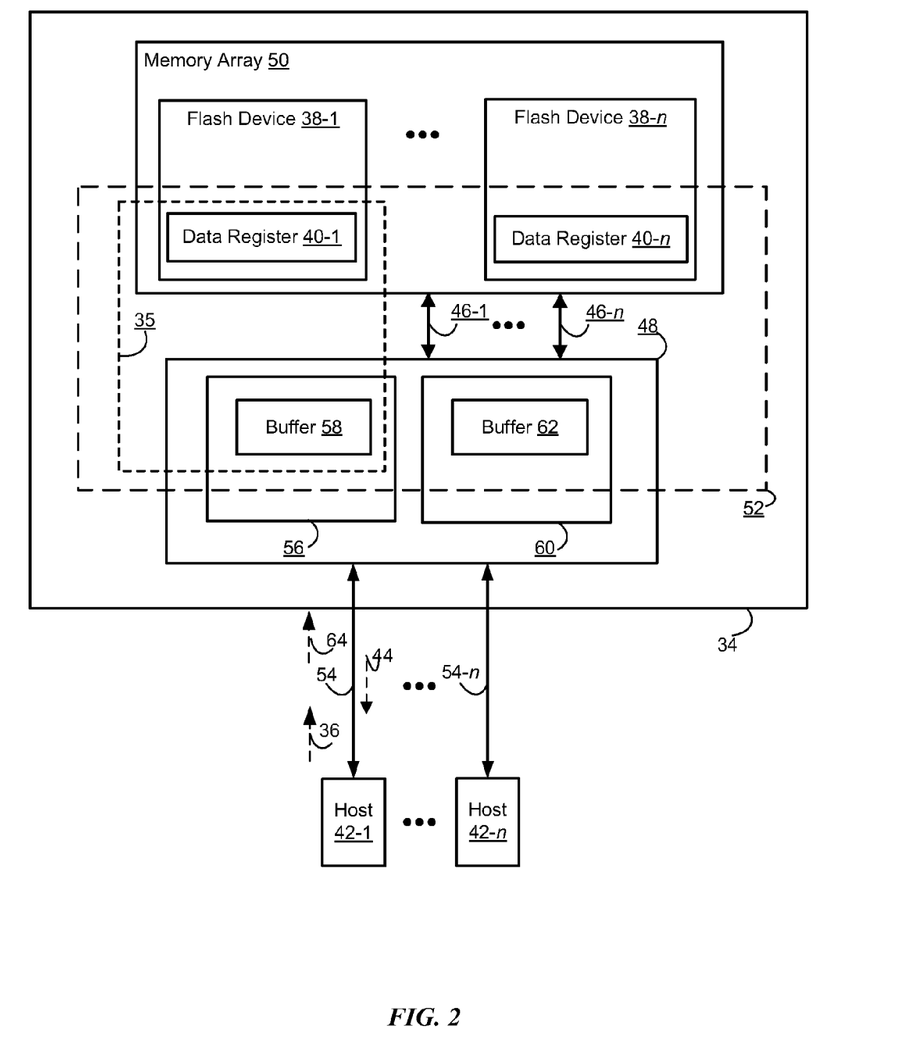
FIG. 2 is a block diagram of a reduced latency memory interface for use in a storage apparatus in accordance with a second embodiment of the present invention.

FIG. 2 illustrates another embodiment of a storage apparatus 34 that supports prefetching transactions and that employs a reduced latency memory interface 48. Storage apparatus 34 includes a memory array 50, which is coupled to memory interface 48 via a memory bus 46. Memory interface 48 is responsive to a memory read transaction request 36 sent via bus 54 from a host 42, and enables storage apparatus 34 to perform reduced latency memory transactions in response to receiving second memory read transaction request 64. In this embodiment, memory interface 48 includes a DMA controller 56 and flash memory controller 60. Buffer set 52 includes data registers 40-1 to 40-n from flash devices 38-1 through 38-n, respectively; at least one buffer from DMA controller 56, such as buffer 58; at least one buffer from flash memory controller 60, such as buffer 62; or any combination of these data registers and buffers. As previously described, a prefetch buffer is a data store that has been allocated to store prefetch data.

The number of buffers allocated as prefetch buffers may be selected at the time of manufacture, during initialization or during the processing of memory operations. In one example, memory interface 48 may initially allocate a selected number of buffers at the time of initialization, and then dynamically adjust the number of buffers allocated as prefetch buffers after initialization, depending on an amount of storage needed for data treated as prefetch data during the processing of memory read transaction requests. This example is not intended to limit the various embodiments disclosed herein. Other embodiments for allocating a selected number of buffers that may be applicable to the example shown in FIG. 2 have been previously disclosed in FIG. 1. In addition, the number of buffers allocated as prefetch buffers may depend on an amount of storage needed for the prefetch data. For instance, memory interface 48 may allocate data register 40-1 and buffer 58 as storage space suitable for storing prefetch data 44. This action may also render non-allocated buffers, such as data registers 40-n and buffer 62 in buffer set 52 available to storage apparatus 34 for other memory uses as needed. Buffers allocated for storing prefetch data, such as buffer 58 and data register 40-1 are hereinafter called "prefetch buffers".

Memory array 50, host 42-1 through 42-n, flash devices 38-1 through 38-n, bus 54 through 54-n, memory read transaction request 36, second memory read transaction request 64 and memory bus 46-1 through 46-n may be implemented to have substantially the same function and structure as memory array 26, host 18-1 through 18-n, flash devices 14-1 through 14-n, bus 20 through 20-n, memory read transaction request 12, second memory read transaction request 32 and memory bus 22-1 through 22-n respectively, disclosed above with respect to FIG. 1.

In this embodiment, buffer set 52 includes buffer 58 and buffer 62. Like data registers 40-1 through 40-n, buffers 58 and 62 form part of buffer set 52 and can be used as prefetch buffers if memory interface 48 allocates these buffers as prefetch buffers. Otherwise, memory interface 24 in FIG. 1 is similar to memory interface 48 in function. For example, when prefetch data 44 is found during an internal read operation, memory interface 48 stores prefetch data 44 into prefetch buffer 35, such as buffer 58 and data register 40-1. Also, if memory interface 48 receives a second memory read transaction request 64, which may be subsequent to the earlier memory read transaction request 36, for data and this data has been previously stored as prefetch data, such as prefetch data 44, and prefetch data 44 is stored in prefetch buffer 35, memory interface 48 initiates a forwarding transaction. This forwarding transaction is similar to the forwarding transaction described earlier with respect to the embodiment corresponding to FIG. 1, above. However, unlike the forwarding transaction described with respect to FIG. 1 which only shows data registers which may be allocated as prefetch buffers, the forwarding transaction here may include obtaining prefetch data from any of the buffers in buffer set 52 if memory interface 48 allocates those buffers as prefetch buffers.

For example, if the data requested in the second memory read transaction 64 has been stored as prefetch data 44, and prefetch data 44 is stored in buffer 58, the forwarding transaction includes retrieving prefetch data 44 from buffer 58 and forwarding prefetch data 44 to the host that sent the second memory read transaction request. In another example, if the data requested in the second memory read transaction request 64 is stored as prefetch data 44, and prefetch data 44 is stored in data register 40-1, the forwarding transaction includes retrieving prefetch data 44 from data register 40-1 and forwarding prefetch data 44 to the host that sent the second memory read transaction request. Thus, memory interface 48 may perform an internal read operation and forwarding transaction using any of the buffers, such as data registers 40-1 through 40-*n*, buffer 58, and buffer 62 that memory interface 48 has allocated as prefetch buffers.

Figure 3:
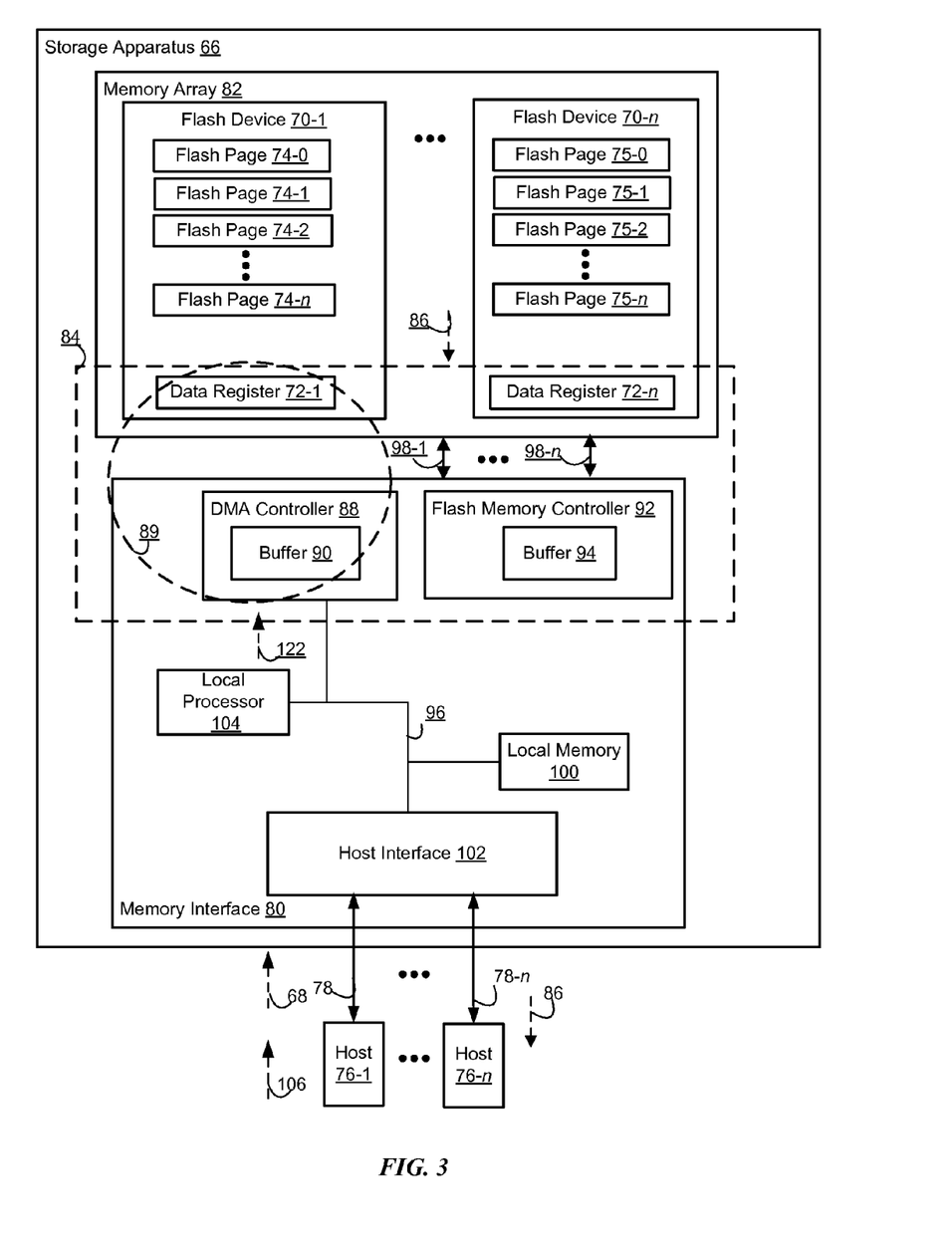
FIG. 3 is a block diagram of a reduced latency memory interface for use in a storage apparatus in accordance with a third embodiment of the present invention.

FIG. 3 illustrates another embodiment of a storage apparatus 66 that supports prefetching transactions and that employs a reduced latency memory interface 80 in accordance with another embodiment of the present invention. Storage apparatus 66 includes a memory array 82 coupled to a memory interface 80 via a memory bus 98. Memory interface 80 is responsive to a memory read transaction request 68 sent via bus 78 from a host 76-1 by enabling storage apparatus 66 to perform a reduced latency memory transaction in response to receiving a second memory read transaction request 106.

Memory interface 80 includes a DMA controller 88, flash memory controller 92, system bus 96, local memory 100, host interface 102 and local processor 104. Host interface 102 allows at least one device, such as host 76-1, to communicate with devices within storage apparatus 66. These devices may include local processor 104, local memory 100 and DMA controller 88 of memory interface 80. For example, memory read transaction request 68 may be received by memory interface 80 through host interface 102, permitting memory interface 80 to process this request as disclosed herein. System bus 96 is a conduit for transferring data between DMA controller 88, local processor 104, local memory 100 and host interface 102. Local processor 104, host interface 102 and DMA controller 88 may access local memory 100 via system bus 96 as needed. Local memory 100 may be implemented using any form of memory, such as various types of DRAM, non-volatile memory and the like.

Memory array 82 includes at least one flash device, such as flash devices 70-1 through 70-*n*, where n may be any number greater than zero (0). Each flash device may include flash pages and data registers. For example, flash devices 70-1 and 70-*n* may each respectively include flash pages 74-0 through 74-*n*, flash pages 75-0 through 75-*n*, and data registers 72-1 through 72-*n*. In this embodiment, data registers form part of buffer set 84. Memory array 82, host 76-1 through 76-*n*, bus 78 through 78-*n*, buffer set 84, memory read transaction request 68, second memory read transaction request 106 and memory bus 98-1 through 98-*n* may be respectively implemented to have substantially the same function and structure as memory array 50, host 42-1 though 42-*n*, bus 54 through 54-*n*, buffer set 52, memory read transaction request 36, second memory read transaction request 64 and memory bus 46-1 though 46-*n* respectively, disclosed above with respect to FIG. 2.

Host 76-1 sends memory read transaction request 68 to storage apparatus 66 for data located in memory array 82. Operating under program control, local processor 104 analyzes and responds to memory read transaction request 68 by generating DMA instructions that will cause DMA controller 88 to read this data from memory array 82 through flash memory controller 92. If this data is available, flash memory controller 92 retrieves this data, which is transferred to local memory 100 by DMA controller 88, and eventually transferred to host 76-1 via host interface 102. Data obtained during this memory read transaction request is hereinafter named "read data".

Local processor 104 also identifies "prefetch data". Prefetch data is any data currently stored in memory array 82 that meets a prefetch selection criterion. This prefetch selection criterion may include a relationship between the read data and any stored data. For example, this prefetch selection criterion may be met if stored data exists that has a memory address within a selected memory address range from the memory address of the read data. In another example, memory interface 80 determines whether this prefetch selection criterion is met by determining whether any stored data exists in memory array 82 that has a memory address within the same page as a memory address associated with the read data. The type of relationship between read data and stored data is not intended to be limiting in any way. Any type of relationship may be used that increases the likelihood that the stored data selected for prefetching will be later requested by a host coupled to a memory interface 80, such as host 76-1.

Local processor 104 may also perform an additional read operation, called an internal read operation. This internal read operation is a process executed by the local processor 104 to retrieve prefetch data 86 from memory array 82. This internal read operation includes local processor 104 sending an instruction, such as instruction 122, to DMA controller 88 to retrieve prefetch data 86 from memory array 82. For example, if memory array 82 addresses stored data by flash page, instruction 122 contains the address of the specific flash page within a flash device that holds prefetch data 86, such as flash page 74-0 and flash device 70-1, respectively. Instruction 122 also causes DMA controller 88 to retrieve prefetch data 86 from the flash page and flash device identified by the address mentioned above.

When DMA controller 88 receives instruction 122, instruction 122 causes DMA controller 88 to use flash memory controller 92 to cause flash device 70-1 to transfer prefetch data 86. The internal read operation also includes local processor 104 allocating a buffer in buffer set 84 to store prefetch data 86. Allocating a buffer as a prefetch buffer may be performed statically, such as at the time of manufacture, dynamically by local processor 104 or both. In one implementation, the number of buffers allocated as prefetch buffers depends on an amount of storage needed for the prefetch data. For example, in FIG. 3, memory interface 80 may allocate data register 72-1 and buffer 90 as storage space suitable for storing prefetch data 86. This action may also render non-allocated buffers, such as data registers 72-*n* and buffer 94 in buffer set 84 available to storage apparatus 66 for other memory uses. Buffers allocated for storing prefetch data, such as buffer 90 and data register 72-*n*, are hereinafter called "prefetch buffers". If a host, such as host 76-1, issues a second memory read transaction request 106 for data and this data has been previously stored as prefetch data in a prefetch buffer such as prefetch data 86 in prefetch buffer 89, local processor 104 responds by retrieving prefetch data 86 from prefetch buffer 89 and by placing prefetch data 86 into local memory 100. When local processor 104 determines local memory 100 contains prefetch data 86, local processor 104 forwards prefetch data 86 from local memory 100 to host interface 102, which in turn transfers the prefetch data to host 76-1. One of ordinary skill in the art having the benefit of this disclosure would readily recognize that rather than using local memory to store prefetch data, prefetch data may be sent directly to the host or processed in any other manner envisioned by a user.

Figure 4:
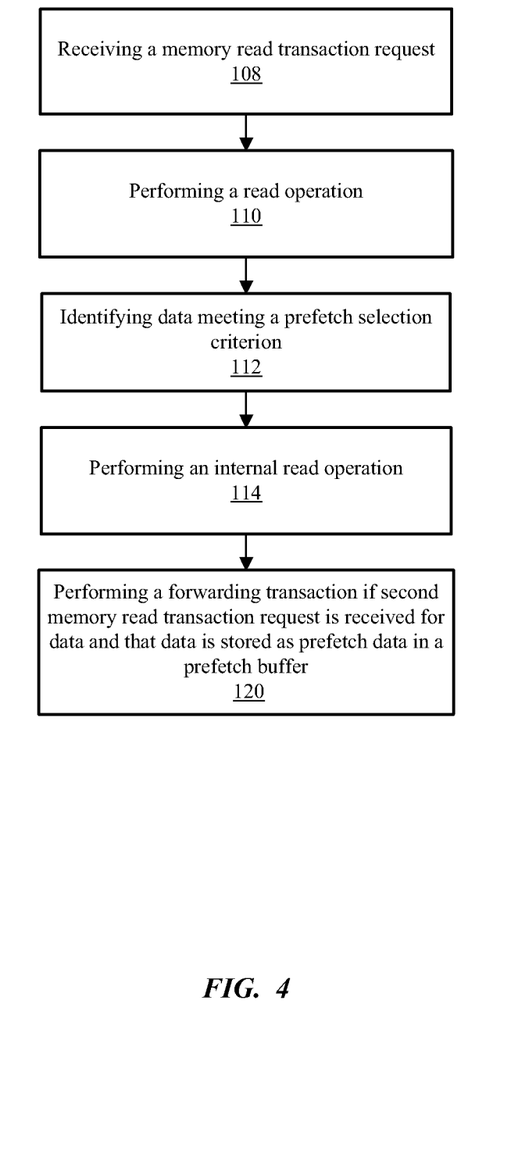
FIG. 4 illustrates a method for using a reduced latency memory interface in a storage apparatus in accordance with a fourth embodiment of the present invention.

FIG. 4 discloses a method for reducing latency in memory read transactions in accordance with another embodiment of the present invention. This method may be performed by using a reduced latency memory interface that is coupled to a memory array that includes a flash device and also coupled to a buffer set that includes a buffer. These elements may be provided in a storage apparatus, such as storage apparatus 10, 34, or 66 in FIGS. 1 through 3, respectively.

Under the method shown, a memory read transaction request is received 108. For example, as shown in FIG. 3, a host 76-1 may send a memory read transaction request 68 to storage apparatus 66, which uses host interface 102 to receive memory read transaction request 68. A read operation is then performed 110. This read operation may be performed by memory interface 80 by obtaining read data requested by host 76-1 from memory array 82. For example, in FIG. 3, memory array 82 responds to memory read transaction request 68 and obtains read data from memory array 82, returning read data to host 76-1 if this data is available.

Local processor 104 identifies 112 data currently stored in memory array 82 that meets a prefetch selection criterion. For example, in FIG. 3, if local processor 104 identifies stored data in memory array 82 that are within a selected address range of the address range of the read data.

If prefetch data is identified, an internal read operation is performed 114. For example, in FIG. 3, memory interface 80 causes a flash device in memory array 82 that holds this prefetch data, such as prefetch data 86, to transfer the prefetch data 86 from a flash page storing the prefetch data. Additionally, the internal read operation includes local processor 104 allocating a buffer as a prefetch buffer in buffer set 84 for storing prefetch data 86. The internal read operation further includes storing prefetch data 86 in a prefetch buffer, such as prefetch buffer 89.

If a second memory read transaction request is received for data and that data is stored as prefetch data in a prefetch buffer, a forwarding transaction is performed 120. For example, referring to FIG. 3, if a second memory read transaction request 106 is received for data and that data is stored as prefetch data 86 in prefetch buffer 89, local processor 104 responds to memory read transaction request 106 and retrieves prefetch data 86 from prefetch buffer 89. Local processor 104 forwards prefetch data 86 from prefetch buffer 89 to local memory 100. Local processor 104 forwards prefetch data 86 from local memory 100 to host 76-1. This transfer of prefetch data 86 from buffer set 84 to local memory 100 is not depicted in FIG. 3 to avoid overcomplicating this herein disclosure. In this example, flash devices 70-1 through 70-*n* function as mass storage devices. However, in another embodiment (not shown), these flash devices may function as a cache to another type of storage device, such as a set of HDDs arranged in a RAID, JBOD or other configuration. This set of HDDs is not shown in the drawings to avoid overcomplicating the herein disclosure, but may be included as part of the memory array, such as memory array 82 in FIG. 3.

While the present invention has been described in particular embodiments, it should be appreciated that the present invention should not be construed as limited by such embodiments. Rather, the present invention should be construed according to the claims below.

We claim:

1. A storage apparatus for performing reduced memory read transactions, said storage apparatus responsive to memory transaction requests from at least one host, the storage apparatus comprising:
    a memory array that includes a plurality of flash memory devices including a first flash memory device, said plurality of flash memory devices including a plurality of data registers, each one of said plurality of flash memory devices including a respective one of said plurality of data registers, said first flash memory device including a data register included in said plurality of data registers;
    said first flash memory device including a set of non-volatile memory cells and said data register;
    a memory interface coupled by a memory bus to said memory array;
    said memory interface coupled by a bus to the at least one host during a transmission of memory transaction requests from the at least one host to said memory interface;
    said memory interface including a Direct Memory Access (DMA) controller comprising a first buffer and a flash memory controller comprising a second buffer;
    a buffer set that includes a plurality of buffers that are suitable for use as prefetch buffers, said buffer set comprising said first buffer in said DMA controller in said memory interface and said second buffer in said flash memory controller in said memory interface;
    wherein said memory interface allocates a plurality of prefetch buffers in said buffer set, said plurality of prefetch buffers including said first buffer in said DMA controller and said second buffer in said flash memory controller so that said buffer set includes said plurality of prefetch buffers allocated for storing prefetch data and one or more non-allocated buffers available to said storage apparatus for other memory uses;
    wherein, in response to receiving a memory read transaction request, said memory interface performs a read operation, said memory interface configured to identify, within said memory array, stored data that meets a prefetch selection criterion and, if said memory interface identifies stored data existing within said memory array that meets a prefetch selection criterion, said memory interface performs an internal read operation that includes allocating said plurality of prefetch buffers in said buffer set and storing said stored data in at least one of said plurality of prefetch buffers as prefetch data; and
    wherein, if said memory interface receives a second memory read transaction request for data and if said data is currently available as said prefetch data in at least one of said plurality of prefetch buffers, said memory interface responds to said second memory read transaction request by performing a forwarding transaction that includes retrieving said prefetch data from at least one of said plurality of prefetch buffers and forwarding said prefetch data to a host, reducing read latency of said second memory read transaction request.

2. The storage apparatus of claim 1, wherein said memory interface further includes a host interface for receiving said memory read transaction request from said host.

3. The storage apparatus of claim 1, wherein said buffer set includes a fixed buffer from said DMA controller.

4. The storage apparatus of claim 1, wherein said buffer set includes a fixed buffer from said flash memory controller.

5. The storage apparatus of claim 1, wherein said flash device contains at least one flash page.

6. The storage apparatus of claim 1, wherein said storage apparatus includes said bus for receiving said memory read transaction request from said host and sending data from the storage apparatus to said host.

7. The storage apparatus of claim 1, wherein said storage apparatus includes a system bus for receiving and sending data between a local processor, said DMA controller, local memory, and a host interface.

8. The storage apparatus of claim 1 wherein said memory interface includes said DMA controller, a local processor, a host interface and local memory coupled together through a system bus; and said memory interface further includes said flash memory controller coupled to said DMA controller and to said memory array through said memory bus.

9. The storage apparatus of claim 1, wherein said buffer set includes a first data register.

10. A method for reducing latency in memory read transactions by using a low latency memory interface coupled to a memory array that includes a plurality of flash memory devices including a flash memory device, wherein said plurality of flash memory devices includes a plurality of data registers, each one of said plurality of flash memory devices including a respective one of said plurality of data registers, and wherein said memory interface responds to memory read transaction requests from a host, the method comprising:

receiving a memory read transaction request;

performing a read operation;

identifying prefetch data in said memory array that meets a prefetch selection criterion;

said memory interface coupled by a memory bus to said memory array;

said memory interface coupled by a bus to the host during a transmission of memory transaction requests from the host to said memory interface;

said memory interface including a Direct Memory Access (DMA) controller comprising a first buffer and a flash memory controller comprising a second buffer;

if prefetch data is identified in said memory array, performing an internal read operation that includes transferring prefetch data, allocating said first buffer as a prefetch buffer suitable for storing prefetch data wherein said prefetch buffer is identified from at least one available buffer available in said buffer set that includes said first buffer in said DMA controller in said memory interface and said second buffer in said flash memory controller in said memory interface;

said flash memory device including a set of non-volatile memory cells and said data register;

said memory interface allocates a plurality of prefetch buffers in said buffer set, said plurality of prefetch buffers including said first buffer in said DMA controller and said second buffer in said flash memory controller so that said buffer set includes said plurality of prefetch buffers allocated for storing prefetch data and one or more non-allocated buffers available for other memory uses;

storing said prefetch data in said at least one of said plurality of prefetch buffers; and performing a forwarding transaction if a second memory read transaction request is received for data stored as prefetch data.

11. The method of claim 10 wherein said prefetching selection criterion is met if said prefetch data is associated with a memory address within the same page as a memory address associated with read data.

12. The method of claim 10 wherein said prefetching selection criterion is met if said prefetch data is associated with a memory address within the same flash device as a memory address associated with data read during said responding to said first memory read transaction request.

13. The method of claim 10 wherein said prefetching selection criterion is met if the memory address of said prefetch data differs within a selected memory address range from the memory address of data read during said responding to said first memory read transaction request.

14. The method of claim 10 wherein said responding to said second memory read transaction request includes transferring said prefetch data from at least one of said plurality of prefetch buffers to local memory.

15. The method of claim 14 wherein said responding to said second memory read transaction request includes forwarding said prefetch data from said local memory to said host.

16. A storage apparatus for performing reduced memory read transactions, the storage apparatus comprising:

a memory array including a plurality of non-volatile memory devices;

said plurality of non-volatile memory devices including a plurality of data registers, each one of said plurality of non-volatile memory devices including a respective one of said plurality of data registers;

each of the non-volatile memory devices including a corresponding set of non-volatile memory cells and a respective data register;

a memory interface coupled by a memory bus to the memory array and responsive to a memory read transaction request;

said memory interface coupled by a bus to the at least one host during a transmission of memory transaction requests from the at least one host to said memory interface;

said memory interface including a Direct Memory Access (DMA) controller comprising a first buffer and a flash memory controller comprising a second buffer; and wherein said memory interface allocates a plurality of prefetch buffers in said buffer set, said plurality of prefetch buffers including said first buffer in said DMA controller and said second buffer in said flash memory controller so that said buffer set includes said plurality of prefetch buffers allocated for storing prefetch data and one or more non-allocated buffers available to said storage apparatus for other memory uses;

the memory interface configured to perform a read operation on the memory array in response to a memory read transaction request and configured to perform an internal read operation if the memory interface identifies stored data, in the memory array, meeting a prefetch selection criterion;

the internal read operation comprising the memory interface allocating a data store in the buffer set and storing the stored data in the data store as a prefetch data available to a second memory read transaction.

17. The storage apparatus of claim 16, wherein the buffer set is formed in the memory interface.

18. The storage apparatus of claim 16, wherein the memory interface responds to the second memory transaction request by performing a forwarding transaction comprising the memory interface retrieving the prefetch data from the data store and forwarding the prefetch data to said host.

19. The data storage apparatus of claim 16, wherein the data store comprises a data register.

20. The storage apparatus of claim 17, wherein the data store comprises a buffer in the memory interface.

21. The storage apparatus of claim 20, wherein the memory interface includes said flash memory controller and the data store comprises a fixed buffer in the flash memory controller.

22. The storage apparatus of claim 20, wherein the memory interface includes said DMA controller and the data store comprises a fixed buffer in the DMA controller.

23. The storage apparatus of claim 16, wherein the memory array, comprises at least one flash device.

24. A method of performing reduced memory read transactions in a storage apparatus, method comprising:

receiving a memory read transaction request and performing a read operation on a memory array; and performing an internal read operation if stored data, in the memory array, meets a prefetch selection criterion;

wherein performing the internal read operation comprises:

allocating a data store in a buffer set formed in a memory interface and storing the stored data in the data store as a prefetch data available to a second memory read transaction;

said memory array including a plurality of non-volatile memory devices, said plurality of non-volatile memory devices including a plurality of data registers, each one of said plurality of non-volatile memory devices including a respective one of said plurality of data registers;

each of said non-volatile memory device including a corresponding set of non-volatile memory cells and a respective data register; and said memory interface coupled by a bus to the at least one host during a transmission of memory transaction requests from the at least one host to said memory interface;

said memory interface including a Direct Memory Access (DMA) controller comprising a first buffer and a flash memory controller comprising a second buffer;

wherein said memory interface, coupled by a memory bus to said memory array, allocates a plurality of prefetch buffers in said buffer set, said plurality of prefetch buffers including said first buffer in said DMA controller said memory interface and said second buffer in said flash memory controller in said memory interface so that said buffer set includes said plurality of prefetch buffers allocated for storing prefetch data and one or more non-allocated buffers available to said storage apparatus for other memory uses.

25. The method of claim 24, wherein the buffer set is formed in the memory interface.

26. The method of claim 24, further comprising:

responding to the second memory transaction request by performing a forwarding transaction comprising retrieving the prefetch data from the data store and forwarding the prefetch data to said host.

27. The method of claim 24, wherein the data store comprises a data register.

28. The method of claim 25, wherein the data store comprises a buffer in the memory interface.

29. The method of claim 28, wherein the memory interface includes said flash memory controller and the data store comprises a fixed buffer in the flash memory controller.

30. The method of claim 28, wherein the memory interface includes said DMA controller and the data store comprises a fixed buffer in the DMA controller.

31. The method of claim 24, wherein the memory array comprises at least one flash device.

32. A method for reducing latency in memory read transactions by using a low latency memory interface coupled to a memory array that includes a flash memory device, and wherein said memory interface responds to memory read transaction requests from a host, the method comprising:

receiving a memory read transaction request;

performing a read operation;

identifying prefetch data in said memory array that meets a prefetch selection criterion;

said memory interface coupled by a memory bus to said memory array;

said memory interface coupled by a bus to the host during a transmission of memory transaction requests from the host to said memory interface;

said memory interface including a Direct Memory Access (DMA) controller comprising a first buffer and a flash memory controller comprising a second buffer;

if prefetch data is identified in said memory array, performing an internal read operation that includes transferring prefetch data, allocating said first buffer as a prefetch buffer suitable for storing prefetch data wherein said prefetch buffer is identified from at least one available buffer available in said buffer set that includes said first buffer in said DMA controller in said memory interface and said second buffer in said flash memory controller in said memory interface;

said flash memory device including a set of non-volatile memory cells and the data register;

storing said prefetch data in said first buffer; and performing a forwarding transaction if a second memory read transaction request is received for data stored as prefetch data.

33. The method of claim 32 wherein said prefetching selection criterion is met if said prefetch data is associated with a memory address within the same page as a memory address associated with read data.

34. The method of claim 32 wherein said prefetching selection criterion is met if said prefetch data is associated with a memory address within the same flash device as a memory address associated with data read during said responding to said first memory read transaction request.

35. The method of claim 32 wherein said prefetching selection criterion is met if the memory address of said prefetch data differs within a selected memory address range from the memory address of data read during said responding to said first memory read transaction request.

36. The method of claim 32 wherein said responding to said second memory read transaction request includes transferring said prefetch data from at least one of said prefetch buffers to local memory.

37. The method of claim 36 wherein said responding to said second memory read transaction request includes forwarding said prefetch data from said local memory to said host.

* * * * *